United States Patent [19]

Cox et al.

[11] 4,393,404
[45] Jul. 12, 1983

[54] SPECIAL SERVICES TELETEXT COMMUNICATIONS SYSTEM

[75] Inventors: Charles M. Cox, Buffalo Grove; Thomas L. William, Northbrook, both of Ill.

[73] Assignee: Zenith Radio Corporation, Glenview, Ill.

[21] Appl. No.: 238,510

[22] Filed: Feb. 26, 1981

[51] Int. Cl.³ .................. H04N 7/00; H04N 7/08
[52] U.S. Cl. .................................. 358/147
[58] Field of Search ........... 358/141, 142, 147, 146, 358/114, 122; 455/26; 375/2

[56] References Cited

U.S. PATENT DOCUMENTS 4,205,343  5/1980  Barrett .......................... 358/147

OTHER PUBLICATIONS

SERT Journal, vol. 11, pp. 209-213, Oct. 1977.
Electronics, vol. 51, No. 20, p. 74, Sep. 28, 1978.
NTG-Fachbev. (Germany), vol. 74, pp. 65-74, 1980.

Primary Examiner—Robert L. Richardson
Attorney, Agent, or Firm—Jack Kail

[57] ABSTRACT

A teletext communications system includes a transmitter cyclically transmitting a plurality of conventional teletext encoded data rows together with one or more teletext encoded special services data rows. A plurality of teletext decoder equipped receivers are operable for acquiring the conventional teletext rows but not the special services rows. Subscribers to the special services data are provided with data decoders responsive to the cyclical transmissions for acquiring only the special services data rows, the data decoders including apparatus for storing the data encoded in an acquired special services data row and for providing a display of the information represented thereby.

6 Claims, 5 Drawing Figures

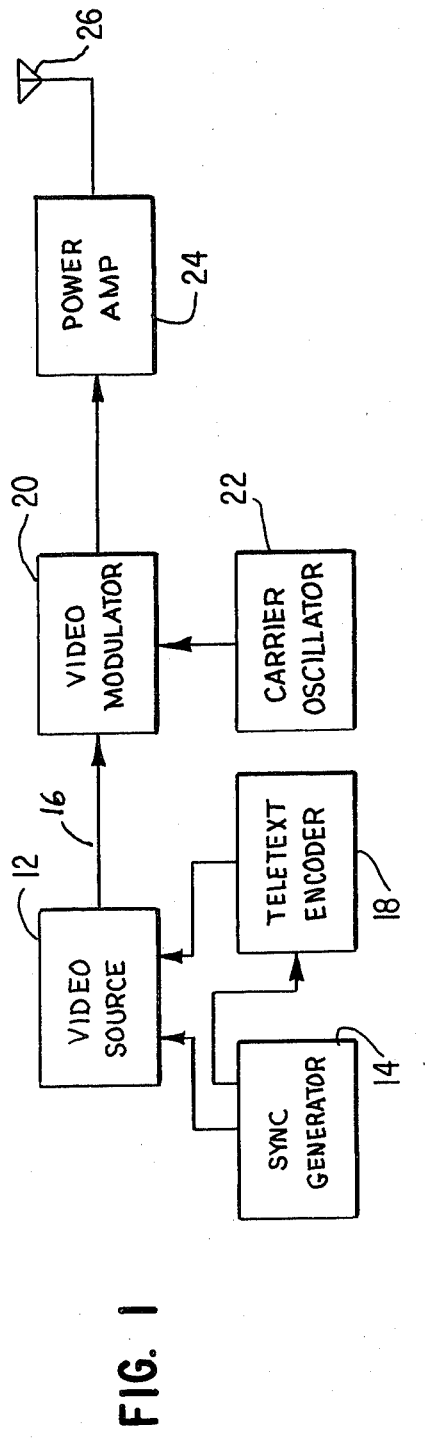

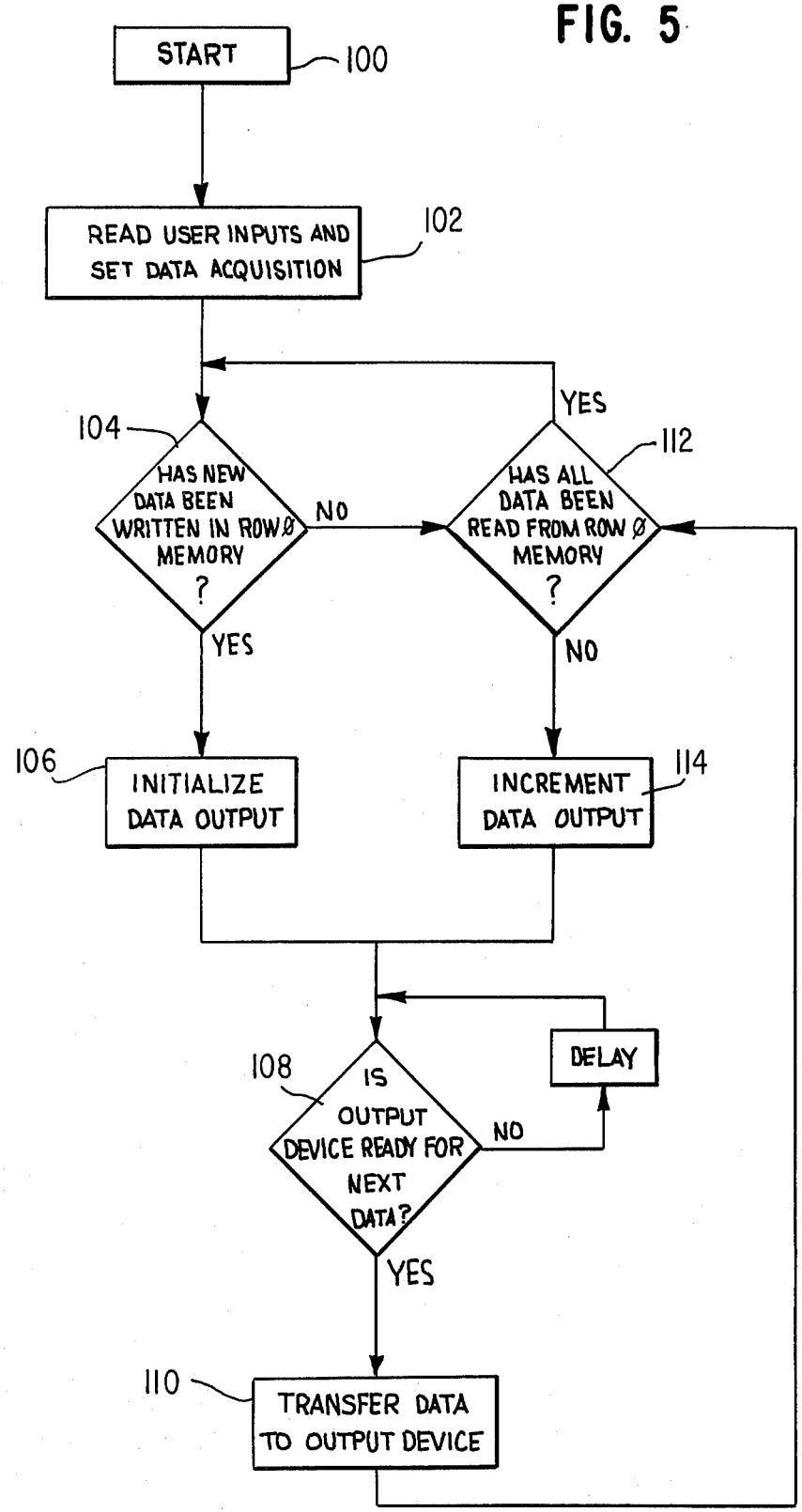

SPECIAL SERVICES TELETEXT COMMUNICATIONS SYSTEM

BACKGROUND OF THE INVENTION

The present invention relates generally to teletext communication systems and, more particularly, to improvements in such systems enabling the efficient communication of selected special services information to limited groups of subscribers who, in general, are not part of the public teletext system.

Teletext is a generic term for a new and rapidly growing television based communication technique which uses the vertical blanking interval of a broadcast television signal for transmission of text and graphics information. Systems implementing this technique are presently operational in various countries, such as in England where teletext formated text and graphics material is transmitted in digitally encoded form on lines 17, 18, 330 and 331 of their 625 line system. Television receivers equipped with teletext decoders process the transmitted data for forming a display of the text and graphics on their viewing screens.

In the British teletext system, which is exemplary of most teletext systems presently in use, the broadcast teletext information is form in a plurality of cyclically transmitted rows of data, twenty four rows comprising a page of information with each group of one hundred pages representing a magazine. Each row of information, which represents up to 40 characters of text or graphics data, is serially transmitted in digitally encoded form on one horizontal line of the vertical blanking interval so that the data transmission rate is two rows per field or four pages per second. In order to provide reasonable access time to the transmitted teletext information it is therefore customary to limit the cyclically transmitted data to 800 pages. Each teletext decoder includes a data acquisition circuit responsive to user commands for acquiring a selected page of the recycling teletext information and for storing the twenty four rows of digitally encoded data comprising the page. The stored encoded data is then applied to a display generator which decodes the stored information for synthesizing R, G, B video character signals which are coupled to and drive the cathode ray tube (CRT) of the television receiver for producing a display reflecting the stored data, the display comprising a page of twenty four rows of text or graphics with each row consisting of up to 40 characters. The first row, i.e. row 0, of each page is referred to as a page-header and includes an encoded magazine and page number as well as a row address. The remaining rows include only magazine and row address but not page number codes. Acquisition of a selected page of data is therefore achieved in the teletext decoder by initially matching the magazine and page number codes of a transmitted page-header row with user selected magazine and page number codes and then storing this matching page-header row together with the twenty three rows containing the corresponding magazine number. In this regard, it is to be appreciated that the data acquisition process cannot be affected until a match is achieved between the magazine and page number codes of a received page-header row and the magazine and page number codes selected by the user of the teletext decoder. The data acquisition time, i.e. the time between the selection by a viewer of a desired page and the presentation thereof on the screen of the receiver, is therefore dependent upon the relative position of the selected page in the cyclical transmission at the time the viewer enters the corresponding magazine and page number codes.

Teletext communication systems of the type generally described above serve a useful purpose in communicating a selected data base to the general public. Naturally, in order to appeal to the public at large and to justify the dedication of a portion of the broadcast television signal to this purpose, the selected data base must of necessity be oriented toward the mass consumer market. However, there exists numerous situations where it may be desired to provide communications of more limited applicability to a limited class of subscribers such as in the case of private newsletters, message services and the like. It would be desirable, from a cost effectiveness viewpoint, to employ existing teletext facilities and techniques to implement such services. But, in doing so, an implementation must be devised which does not significantly increase the access time by the general public to normal teletext communications and which makes the special services communications only available to the subscribers thereof and not to the owners of conventional teletext equipped receivers.

It is therefore a basic object of the invention to provide an improved teletext type communication system in which a selected general applicability data base may be communicated through a conventional teletext signal to each member of the general public having a teletext decoder equipped receiver while employing the same system to transmit special services information which may only be acquired by a limited group of subscribers.

It is another object of the invention to provide a teletext communication system of the foregoing type in which maximum use is made of existing teletext equipment and facilities.

A further object of the invention is to provide for the transmission of the special services information together with the normal teletext signal but without significantly affecting the access time thereto.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

FIG. 1 is a general block diagram showing the video portion of a television signal transmitter including a teletext encoder;

FIG. 2 is a chart showing, for purposes of example, the British teletext signal format;

FIG. 5 is a flow chart illustrating the method of programming the microprocessor of the data decoder of FIG. 4.

DESCRIPTION OF THE PREFERRED EMBODIMENT

Figure 3:
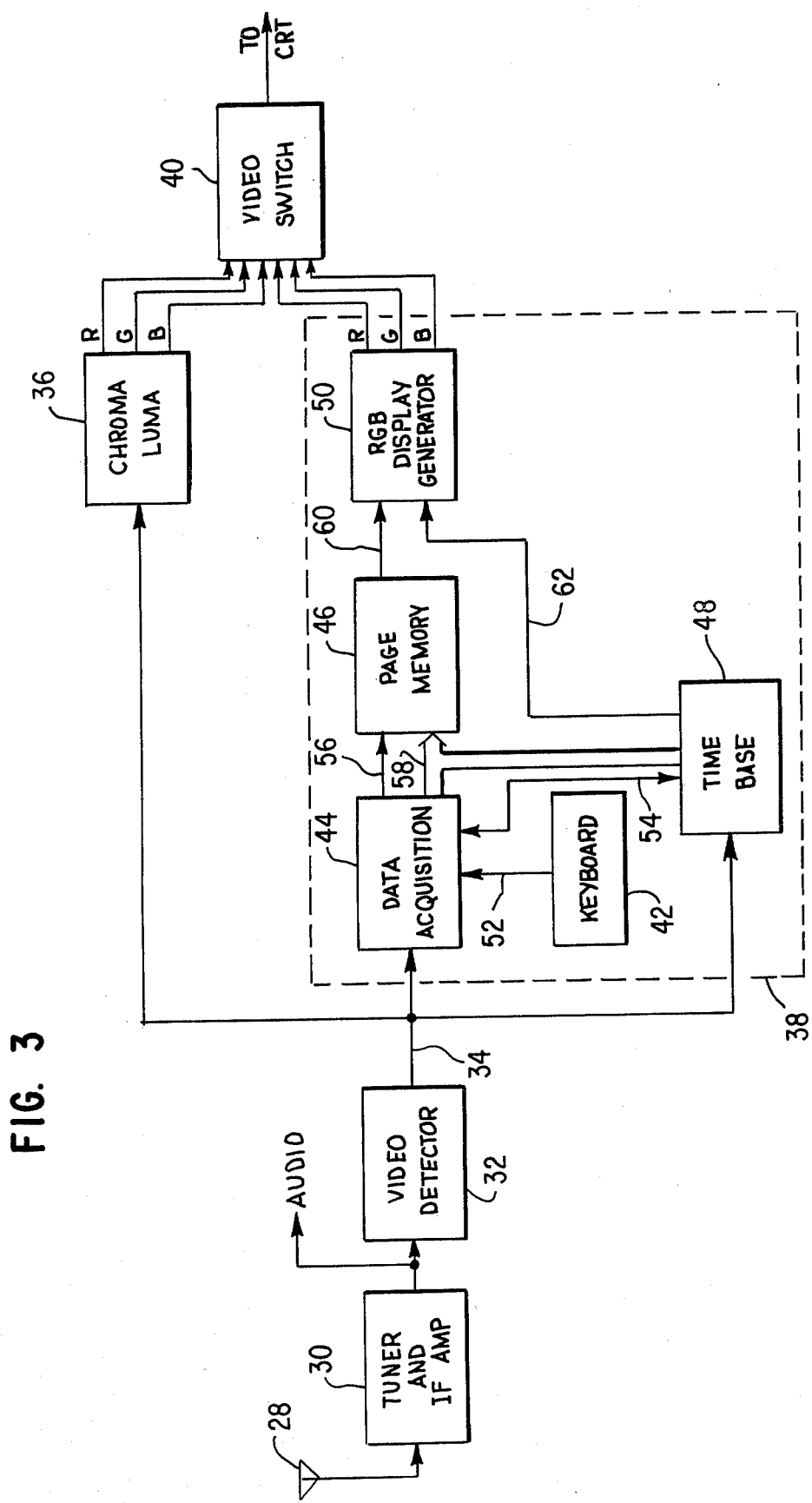
FIG. 3 is a block diagram illustrating pertinent portions of a television receiver equipped with a conventional teletext decoder.

For purposes of an exemplary showing, the present invention will hereinafter be described in terms of certain improvements to a teletext communication system employing the British teletext transmission standards as set forth in the British Broadcast Teletext Specification, September, 1976. It will be appreciated, however, that these standards are in no way intended to limit the scope of the invention which, in general, may be practiced with any teletext communication system wherein digitally encoded data is cyclically transmitted on one or more unused lines of the vertical blanking interval of a broadcast television signal. Thus, numerous changes to the British teletext format; for example, the number of data rows comprising a page, the number of characters occupying a row, the encoding technique employed, etc., may be m without affecting the scope or utility of the invention.

Referring now to the drawings and, in particular, to FIG. 1, there is shown a conventional television signal transmitter adapted for transmitting a teletext signal in the vertical blanking interval of a broadcast television signal. The transmitter comprises a video channel, the associated audio channel not being shown, which includes a normal video signal source 12 responsive to a sync generator 14 for developing a conventional baseband video signal on an output conductor 16, which baseband video signal includes standard horizontal and vertical synchronization signals. Video signal source 12 also receives an input from a teletext encoder 18 which develops an appropriately bandlimited digitally encoded serial data signal and inserts this encoded signal in one or more unused horizontal lines of the vertical blanking interval of the composite video signal developed on conductor 16. In the British teletext system, lines 17, 18, 330 and 331 of their 625 line system are used for this purpose. The teletext encoded composite signal is subsequently coupled from conductor 16 to a video modulator 20 for amplitude modulating a carrier signal developed by a carrier oscillator 22, the resulting amplitude modulated signal being amplified by a power amplifier 24 and transmitted via an antenna 26.

The format of the teletext encoded data transmitted during the vertical blanking interval of the broadcast television signal is illustrated in chart form in FIG. 2. Each of the teletext dedicated lines of the vertical blanking interval is encoded with 360 serially transmitted bits arranged in 45 Bytes of eight bits each and commonly referred to as a data row. Twenty four data rows comprise a page which represents the amount of information normally displayed on the viewing screen of a television receiver equipped with a teletext decoder, the pages being arranged into groups of 100 each denoting a magazine. Row 0 of each page is referred to as a page-header and includes three initial Bytes, two clock run-in Bytes and a framing code Byte, which serve to synchronize the bit and Byte recovery operation in the receiver. The next two Bytes of the page-header row are encoded for identifying the magazine and row address while the page number code is contained within the next two Bytes. The next four Bytes are reserved for time codes followed by two control group codes. The last 32 Bytes of the page-header row are character Bytes each of which comprises an ASCII code representing a selected text or graphics character. The format of each of the remaining 23 rows is identical with the first three Bytes containing synchronization information, the next two Bytes magazine and row address information and the last 40 Bytes character information.

As mentioned previously, each row of teletext data is transmitted on a single horizontal line during the vertical blanking interval of the television signal. The rows are transmitted one after the other in a cyclical manner so that a magazine of 100 pages may be transmitted in a time period of 25 seconds. Typically, the entire data base is limited to eight magazines whereby all 800 pages of the data base are transmitted during each of a succession of 200 second intervals. As will be explained in further detail below, a viewer may acquire and display any selected page of the cyclically transmitted data base, the acquisition time of the selected page depending upon the relative timing between the viewer's request and the position of the desired page within the data base transmission time interval. Once acquired, the page will be displayed on the viewer's television screen in the form of 24 rows of characters, the first row containing 32 characters representing the 32 character Bytes of the transmitted page-header row and each of the remaining 23 rows containing 40 characters representing the 40 character Bytes transmitted during the corresponding data line.

A television receiver including a conventional teletext decoder adapted for acquiring and displaying a selected page of the cyclically transmitted teletext data base is illustrated in FIG. 3. For example, see Mullard Technical Information Note 54 (Mullard Ltd., Mullard House, Torrington Place, London WC1E7HD) in which the teletext equipment is described in great detail. The television receiver includes an antenna 28 for intercepting and coupling the broadcast teletext encoded television signal to a tuner and IF amplifier stage 30. Stage 30 converts the received signal to an intermediate frequency signal which is coupled to the audio section of the receiver (not shown) and also to a video detector stage 32 which develops a corresponding composite baseband video signal on a conductor 34. The composite baseband video signal developed on conductor 34 is coupled to a conventional television receiver chroma-luma stage 36 and also to the teletext decoder 38. Chroma-luma stage 36 operates in a conventional manner for developing R, G, B output signals representing the televised video image, the R, G, B output signals being coupled to a video switch 40 whose output supplies the CRT of the television receiver. When video switch 40 is operated for passing the R, G, B output signals developed by chroma-luma stage 36 to the CRT, the television receiver is operated in a conventional mode wherein a color video image is displayed on the viewing screen corresponding to the normally broadcast television signal. The broadcast teletext data will not contribute to the display in this mode since it is encoded in the vertical blanking interval of the television signal which is blanked from the viewing screen. As will be explained in further detail below, when video switch 40 is operated for passing the R, G, B signals representing a page of teletext information, the twenty four rows of teletext characters will be displayed on the viewing screen. This page of information may be displayed either to the exclusion of the normal video signal by operating video switch 40 so as to inhibit the transmission of the R, G, B signals developed by chroma-luma stage 36 or the page may be superimposed over the normal video image in a mixed format by operating video switch 40 for coupling the R, G, B signals from both chroma-luma stage 36 and teletext decoder 38 to the CRT.

Teletext decoder 38 typically comprises a keyboard 42, a data acquisition circuit 44, a page memory 46, a time base circuit 48 and an RGB display generator 50. In order to display a desired page of teletext data, keyboard 42 is operated by the viewer for coupling the selected page number code, together with the magazine number code identifying the magazine in which the desired page is located, to data acquisition circuit 44 over a line 52. Data acquisition circuit 44, under the control of timing signals received from time base circuit 48 via a conductor 54, acquires or grabs the transmitted data page selected on the keyboard and couples the encoded character Bytes representing the page for storage in page memory 46. The page of encoded character Bytes stored in page memory 46 are subsequently read from memory and applied to RGB display generator 50 which converts the encoded character Bytes to R, G, B signals, which may be thought of as internally synthesized video signals, suitable for driving the CRT for displaying the 24 rows of text and/or graphics represented by the encoded character Bytes.

More specifically, time base circuit 48 includes apparatus for counting the horizontal scanning lines of the composite baseband video signal developed on conductor 34 and for developing an output signal on conductor 54 enabling data acquisition circuit 44 during the lines of the vertical blanking interval when encoded teletext data is being transmitted, i.e., for example, lines 17, 18, 330 and 331 in the case of the British system. When enabled, data acquisition circuit 44 is operative for comparing the page and magazine number codes coupled thereto from keyboard 42 with the page and magazine number codes of each received teletext line, the latter page and magazine number codes being coupled to data acquisition circuit 44 by conductor 34. Referring back to FIG. 2, it will be recalled that only the horizontal lines used to transmit page-header rows include both magazine and page number codes, the remaining lines including magazine but not page number codes. As a consequence, only a page-header row will result in an equality comparison by data acquisition circuit 44. Once this equality comparison has been achieved by data acquisition circuit 44, the subsequently received data rows with matching magazine number codes will be acquired and coupled for storage in page memory 46, together with the associated page-header row, until the next page-header row having the same magazine number code is received. In the meantime, any received data rows having non-matching magazine number codes will be totally ignored by the data acquisition circuit. Thus, data acquisition circuit 44 will acquire for storage in page memory 46 all of the data rows having a magazine number code matching the magazine number code of the page-header row which resulted in the equality comparison, this data acquisition process being terminated upon the receipt of a subsequent page-header row having the same magazine number code. In order to faithfully acquire a complete page of information it is therefore necessary to transmit all of the data rows of the page between its page-header row and the next occurring page-header row having a matching magazine number code. Also while any data row having a different magazine number code may be transmitted between the two foregoing page-header rows, precautions must be taken to prevent the transmission of a data row having the same magazine number code but associated with a different page since the data acquisition circuit will be unable to detect this difference.

Page memory 46 contains sufficient memory capacity to store one complete page of acquired teletext data. Thus, the memory, which typically comprises a 1K Byte RAM, can be viewed as a 24 row by 40 column matrix of individually addressable 8 bit memory locations. Each character Byte of a data row acquired by data acquisition circuit 44 is coupled to page memory 46 by a data line 56 and written into a corresponding memory location thereof in accordance with the address signals developed on an address bus 58, the address signals being formed by the row address code transmitted with the data row and an internally generated column address code which is incremented in response to each character Byte of the acquired data row. In other words, the row address code transmitted with each data row will cause the character Bytes of that row to be stored in the corresponding memory address row of page memory 46 while a clock internal of data acquisition circuit 44 will increment the column address for each character Byte of the row. In this manner, page memory 46 is loaded for storing an entire page of teletext data; at row address 0, columns 9–40, the 32 character Bytes of the page-header row, at row address 1, columns 1–40, the character Bytes of row 1, and so on. Normally, the first eight memory locations of the first row of the page memory are reserved for data internally generated by the teletext decoder.

During active display time time base circuit 48 is operative for developing a sequence of addressing signals which are coupled to address bus 58 causing the encoded character Bytes stored in the memory to be read onto a data bus 60 and coupled thereby to RGB display generator 50. These addressing signals sequentially access the character Bytes stored in each memory row for ten successive horizontal scanning lines starting from memory row 0 and proceeding with each subsequent memory row in turn. Therefore, during each of the first ten active horizontal scanning lines the character Bytes stored in the first memory row are sequentially read out onto data bus 60, during each of a second group of ten horizontal scanning lines the character Bytes stored in the second memory row are sequentially read out onto data bus 60, and so on.

RGB display generator 50, which is responsive to synch signals supplied by a conductor 62 from time base circuit 48, converts each row of encoded memory Bytes read onto data bus 60 into ten horizontal lines of RGB video signals which are adapted for causing the CRT to develop a color display reflecting a ten line row of text and/or graphics corresponding to the encoded character Bytes. Thus, during the first group of ten horizontal lines the text and/or graphics corresponding to the data stored in encoded form in the first memory row of the page memory will be displayed on the viewing screen, during a following group of ten horizontal lines the text and/or graphics corresponding to the encoded data stored in the second memory row of the page memory will be displayed, and so on until the entire page stored in the memory is displayed in terms of 24 rows of 40 characters each.

According to the present invention, the basic teletext system as described above is used to transmit additional data in the form of special services information to one or more groups of subscribers without making the additional data available to or acquireable by members of the general public who own conventional teletext equipped television receivers. By employing the existing facilities of the conventional teletext communication system both in the signal transmission and reception senses, the special services information may be provided to the subscribers in a relatively cost effective manner.

The foregoing is accomplished by operating the teletext encoder at the transmitting site for inserting the special services information in the teletext broadcast in the form of one or more specially encoded page-header rows. The special page-header rows, which are transmitted by the teletext transmitter on horizontal lines in the vertical blanking interval just as in the case of conventional teletext data rows, include magazine and page number codes not within the capability of conventional teletext acquisition. That is, for example, the magazine codes identifying the special page-header rows may be selected from among any code not within the generation capability of keyboard 42 of conventional teletext decoder 38. Each subscriber to the special services information transmitted by the special page-header rows is provided with a teletext type decoder, referred to hereinafter as a data decoder, which includes a data acquisition circuit substantially identical to data acquisition circuit 44 of FIG. 3 but set for effecting a comparison with the magazine and page number codes of the special page-header rows to facilitate acquisition thereof. Once acquired by a subscriber, the data contained in the special page-header row, which may comprise a sequence of ASCII character Bytes similar to those used in conventional teletext transmissions or any other form of encoded data, is stored and then used to operate an appropriate output device for presenting the data to the subscriber.

Figure 4:
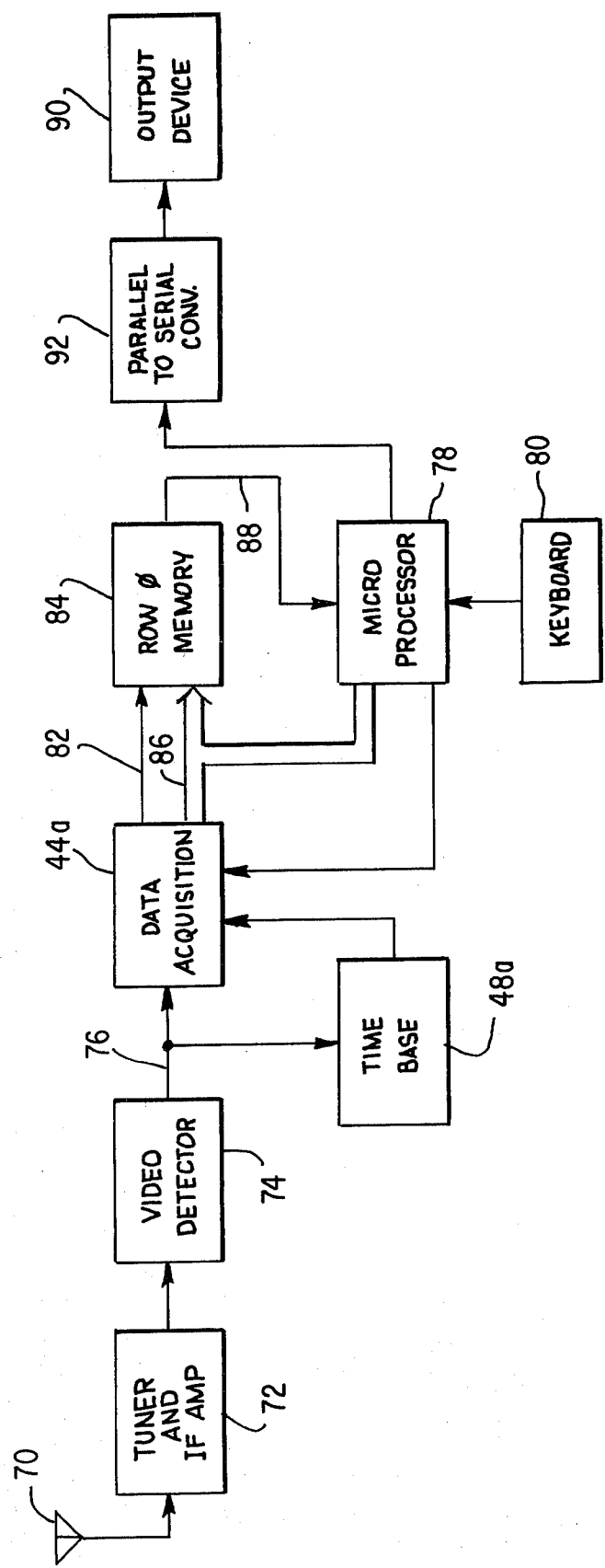
FIG. 4 is a block diagram illustrating a novel data decoder adapted for acquiring and storing special services information transmitted together with a conventional teletext signal in accordance with the present invention.

FIG. 4 illustrates a data decoder suitable for processing the transmitted special page-header rows. The data decoder includes an antenna 70 for intercepting the transmitted television signal including the conventional teletext data and the special page-header rows inserted in the vertical blanking interval thereof. The intercepted signal is processed by a tuner and IF amplifier stage 72 and a video detector 74 which develops a corresponding baseband signal on an output conductor 76. Output conductor 76 of video detector 74 supplies a data acquisition circuit 44a and a time base circuit 48a both of which are substantially identical to the corresponding components of teletext decoder 38. A microprocessor 78, operated in response to a suitable keyboard 80, couples the magazine and page number codes identifying a selected one of the special page-header rows for enabling acquisition thereof by data acquisition circuit 44a. That is, data acquisition circuit 44a is enabled by time base circuit 48a during, for example, horizontal lines 17, 18, 330 and 331 for comparing the magazine and page number codes supplied by microprocessor 78 with the magazine and page number codes of each received page-header row, including both the special page-header rows and the normal teletext page-header rows. Upon satisfaction of the comparison, the special page-header row is acquired and the data Bytes contained therein are coupled via data bus 82 for storage in a row memory (RAM) 84 in response to address signals developed on an address bus 86. Subsequently, under the control of addressing signals coupled to address bus 86 by microprocessor 78, the stored data is read out of memory 84 onto a data bus 88, buffered by microprocessor 78 and coupled to an output device 90, e.g. a printer or the like, through an optional parallel to serial converter 92. The buffering action of microprocessor 78 insures that the output data rate is compatible with the particular output display device 90 used by the subscriber.

Since the special services information is transmitted in terms of individual page-header row, the memory capacity of memory 84 is limited to that sufficient to store a single row of, for example, 32 eight bit data Bytes. Therefore, the memory locations of memory 84 are identified by a single row address and 32 column addresses. As a result, data may be written into or read out of memory 84 by addressing the single row address while incrementally increasing the column address.

The operation and programming of microprocessor 78 is more fully set forth in the flow chart of FIG. 5. Initially, after a start command 100, an instruction block 102 causes the microprocessor to read the user inputs, including the selected magazine and page number codes, from keyboard 80 and to couple the input codes for setting data acquisition circuit 44a. Next, in accordance with block 104, the data stored in memory 84 is interrogated to determine whether it represents new data received from data acquisition circuit 44a. That is, if the data currently stored in memory 84 is different from the stored data during the previous decision by block 104 a YES decision is arrived at and otherwise a NO decision results. A YES decision from block 104 therefore indicates that new data has been written into memory 84, which new data must be coupled for display to output device 90. Therefore, an instruction block 106 accesses the first column address of the memory and, if output device 90 is ready to accept the data stored therein (decision block 108), the data is transferred to device 90 in accordance with instruction block 110. If output device 90 is not ready to accept the data, block 108 is re-executed after a short delay. Once the data is transferred to output device 90 in accordance with the instruction of block 110, a decision is effected by a block 112 as to whether all of the data stored in the memory has been read and transferred to output device 90. If not, an instruction 114 is exercised incrementing the column address and repeating the decision of block 108 and the instruction of block 110 for the next data Byte. This process is continuously repeated until all of the data Bytes stored in memory 84 have been read and coupled to output device 90 at a rate compatible with the operation thereof. At this time, a YES decision is arrived at by block 112 requiring re-execution of the decision represented by block 104. If no new data has been stored in memory 84, the program continues to cycle between block 112 and 104 waiting for the acquisition and storage of a new special page-header row. Upon acquisition and storage of a new special page-header row, a YES decision again results from block 104 and the entire process is repeated leading to the transfer of the new data to output device 90 for display.

It will be appreciated that various modifications to and extensions of the invention as described above are possible. For example, one or more of the data Bytes contained in the special page-header rows can be used to further limit access to the special services information. Thus, in addition to requiring matching magazine and page number codes to enable acquisition of the special page-header row, additional code matchings may be required to distinguish among different groups of subscribers. In this manner, for example, by periodically changing the transmitted additional codes during the course of a day, access to the special page-header rows can be accordingly limited thereby permitting one special page-header row to be used for a variety of different services.

Among the advantages of a system as described herein are that existing teletext transmission facilities and signals may be used to transmit the special services information to paying subscribers while effectively preventing acquisition thereof by owners of conventional teletext decoders. Also, the data decoders used to acquire and store the special services information are constructed largely employing conventional teletext decoding circuits so that major design efforts are not required. Finally, due to the fact that the time required to transmit the special page-header rows is only a very small percentage of the time required to transmit the normal teletext data base, access time thereto by the general public is not significantly increased.

While particular embodiments of the invention have been shown and described, it will be apparent that changes and modifications may be made therein without departing from the invention in its broader aspects. The aim of the appended claims, therefore, is to cover all such changes and modifications as fall within the true spirit and scope of the invention.

What is claimed is:

1. In a teletext communications system including a transmitter cyclically transmitting a plurality of teletext encoded data rows a selected number of which define a data page, the first data row of each data page comprising a page-header data row characterized by a page number address code for enabling acquisition of the remaining data rows of the respective data page by each of a plurality of standard teletext decoders, the improvement comprising:
    means cooperating with said teletext transmitter for inserting at least one additional page-header formatted data row in said cyclical transmission, said additional page-header formatted data rows each including selected encoded data and a page number address code adapted for preventing acquisition thereof by said plurality of standard teletext decoders; and
    at least one data decoder comprising means adapted for receiving said cyclical transmission, means responsive to the page number address code of a received additional page-header formatted data row for acquiring only said additional page-header formatted data row and means comprising a single data row memory for storing the data encoded in said acquired additional page-header formatted data row.

2. The improvement according to claim 1 wherein said data decoder further comprises an output device adapted for presenting an intelligible representation of said stored encoded data to a system subscriber.

3. The improvement according to claim 2 including buffer means interposed between said storage means and said output device for coupling said stored encoded data to said output device at a rate compatible with the operating characteristics thereof.

4. A data decoder for receiving a plurality of cyclically transmitted teletext encoded data rows a selected number of which define a data page, the first data row of each data page comprising a page-header data row characterized by a page number address code for enabling acquisition of the remaining data rows of the respective data page by each of a plurality of standard teletext decoders and at least one additionally transmitted page-header formatted data row comprising a special services row including encoded data and a page number address code adapted for preventing acquisition thereof by said plurality of standard teletext decoders, said data decoder comprising:
    means adapted for receiving said cyclical transmission;
    means responsive to the page number address code of a received additional page-header formatted data row for acquiring only said special services data row; and
    means comprising a single data row memory for storing the data encoded in said acquired special services row.

5. A data decoder according to claim 4 wherein said data decoder further comprises an output device adapted for presenting an intelligible representation of said stored encoded data to a system subscriber.

6. A data decoder according to claim 5 including buffer means interposed between said storage means and said output device for coupling said stored encoded data to said output device at a rate compatible with the operating characteristics thereof.

* * * * *